United States Patent [19]

Sato et al.

[11] Patent Number: 5,089,330
[45] Date of Patent: Feb. 18, 1992

[54] ABRASIVE TAPE IN WHICH A SINGLE COMPOUND SERVES TO IMPROVE DISPERSION OF ABRASIVE PARTICLES AND ALSO AS ANTISTATIC AND LUBRICANT FOR THE TAPE

[75] Inventors: Masami Sato; Masaaki Fujiyama; Yasuo Nishikawa; Takashi Iwasaki, all of Kanagawa, Japan

[73] Assignee: Fuji Photo Film Co., Ltd., Tokyo, Japan

[21] Appl. No.: 642,156

[22] Filed: Jan. 17, 1991

Related U.S. Application Data

[63] Continuation of Ser. No. 414,346, Sep. 29, 1989, abandoned.

[30] Foreign Application Priority Data

Sep. 30, 1988 [JP] Japan ................................. 63-247220

[51] Int. Cl.$^5$ .............................................. G11B 5/71
[52] U.S. Cl. ................................... 428/323; 428/329; 428/687; 428/694; 428/695; 428/900; 252/52 A; 252/45
[58] Field of Search ............... 428/900, 329, 694, 323, 428/687, 695; 51/295; 252/52 A, 45

[56] References Cited

U.S. PATENT DOCUMENTS 4,187,345 2/1980 Yamaguchi et al. ................. 428/337
4,701,375 10/1987 Nishimatsu et al. ................. 428/336
4,764,423 8/1988 Yamaguchi et al. ................. 428/323
4,770,941 9/1988 Imai et al. ......................... 428/411.1

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

An abrasive tape comprises a flexible substrate and an abrasive layer which is overlaid on the flexible substrate and which contains abrasive grains, a binder, and an additive. The additive contains at least one kind of a compound represented by the general formula of $$R_1-X-(CH_2CHO)_n-H$$
$$\quad\quad\quad\quad\quad\quad |$$
$$\quad\quad\quad\quad\quad\quad R_2$$

where $R_1$ represents a monovalent hydrocarbon group having six to 30 carbon atoms, or a fluorine-substituted alkyl group having one to 17 carbon atoms, $R_2$ represents H or a monovalent alkyl group having one to three carbon atoms, X represents either one of $$-N-, -S-, -SO_2- \text{ and } -SO_2N-$$
$$\;|\quad\quad\quad\quad\quad\quad\quad\quad\quad\quad\quad\quad\;|$$
$$\;H\quad\quad\quad\quad\quad\quad\quad\quad\quad\quad\quad\quad R_3$$

where $R_3$ is $C_3F_7$ and n is an integer of 1 to 30.

11 Claims, 1 Drawing Sheet

ABRASIVE TAPE IN WHICH A SINGLE COMPOUND SERVES TO IMPROVE DISPERSION OF ABRASIVE PARTICLES AND ALSO AS ANTISTATIC AND LUBRICANT FOR THE TAPE

This is a Continuation of application Ser. No. 07/414,346 filed Sept. 29, 1989 now abandoned.

BACKGROUND OF THE INVENTION

1. Field of the Invention

This invention relates to an abrasive tape which is used to polish a magnetic head or the like. This invention particularly relates to an abrasive tape which is used for finish polishing of a rough-polished surface of a magnetic head or the like.

2. Description of the Prior Art

Video or high-grade audio magnetic heads are made by being polished with abrasive tapes. The abrasive tape comprises a flexible substrate, and an abrasive layer overlaid on the flexible substrate. In order to provide the abrasive layer, an abrasive coating composition consisting of abrasive grains, a binder, additives and the like is applied onto the flexible substrate and dried.

The term "abrasive tape" as used herein broadly embraces abrasive members which take on the form of a long strip or a disk. In general, when the surface of a magnetic head or the like is to be polished with a long strip-like abrasive tape, two reels are positioned with the magnetic head or the like intervening therebetween, and the abrasive tape is moved in contact with the surface to be polished between two reels. In cases where a disk-shaped abrasive tape is used, the disk is rotated in order to polish a surface.

The abrasive tape is flexible and can snugly fit to a curved surface. Therefore, the abrasive tape is more suitable for the polishing of the curved surface of the magnetic head or the like than grinding wheels. Also, the abrasive tape can achieve scratch-free, accurate polishing of the surface to be polished, and is therefore indispensable to finish polishing of a rough-polished surface.

In cases where the abrasive tape is moved in an polishing apparatus in order to polish a surface of a magnetic head, it is necessary that movement stability of the abrasive tape be kept good. Also, the surface of the abrasive tape should be prevented from being electrostatically charged. Furthermore, abrasive grains should be dispersed uniformly in an abrasive layer of the abrasive tape. Specifically, if movement stability of the abrasive tape is low, the abrasive tape will stick and slip on the surface of the magnetic head and generate a chirping sound during movement. In such cases, the surface to be polished cannot be polished uniformly. If the surface of the abrasive tape is electrostatically charged due to friction with the surface to be polished, ambient dust will stick to the surface of the abrasive tape and will undesirably scratch the surface to be polished. If abrasive grains are dispersed nonuniformly in the abrasive layer of the abrasive tape, the abrasive grains will agglomerate locally and will undesirably scratch the surface to be polished.

Various methods have been proposed in order to solve the problems described above. For example, in Japanese Patent Publication No. 62(1987)-37447, a method is proposed wherein additives such as a lubricant and an antistatic agent are added to an abrasive layer of an abrasive tape, and the proportions of the additives are changed in order to adjust the coefficient of friction of the surface of the abrasive tape. In U.S. Pat. No. 4,764,423, a method is proposed wherein a fatty acid, a fatty acid ester, silicone oil, and a surface-active agent are added to an abrasive layer of an abrasive tape in order to improve movement stability of the abrasive tape. Also, in Japanese Unexamined Patent Publication No. 61(1986)-265279, a method is proposed wherein a dispersing agent and an antistatic agent, such as carbon black or titanium black, are added to an abrasive tape.

However, with the proposed methods, the lubricant, the antistatic agent, and the dispersing agent are added independently in order to improve tape movement stability, to prevent electrostatic charging, and to improve dispersibility of abrasive grains. Therefore, when these additives are added to the abrasive layer of the abrasive tape so that all of the three requirements are satisfied, the proportions of the additives to the abrasive layer increase. As a result, strength of the abrasive layer deteriorates, and polishing performance of the abrasive tape becomes bad.

SUMMARY OF THE INVENTION

The primary object of the present invention is to provide an abrasive tape having an abrasive layer which contains small proportions of an additive, improves movement stability of the abrasive tape, and is free of electrostatic charging, and wherein abrasive grains are dispersed uniformly.

Another object of the present invention is to provide an abrasive tape which has substantially good polishing performance.

The inventors carried out studies in order to accomplish the aforesaid objects, and found that a specific compound serves as a movement stability improving agent, an antistatic agent, and a dispersing agent. In cases where the specific compound is added as an additive to an abrasive layer of an abrasive tape, an abrasive tape having good characteristics can be obtained while the amount of the additive added is kept small.

Specifically, the present invention provides an abrasive tape comprising a flexible substrate and an abrasive layer which is overlaid on said flexible substrate and which contains abrasive grains, a binder, and an additive, wherein said additive contains at least one kind of a compound represented by the general formula of

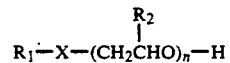

where $R_1$ represents a monovalent hydrocarbon group having six to 30 carbon atoms, or a fluorine-substituted alkyl group having one to 17 carbon atoms, $R_2$ represents H or a monovalent alkyl group having one to three carbon atoms, X represents either one of

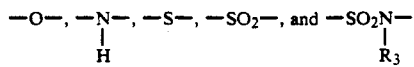

and n is an integer of 1 to 30.

With the abrasive tape in accordance with the present invention, an improvement in tape movement stability, prevention of electrostatic charging, and an improvement in dispersibility of abrasive grains can be achieved only by the addition of at least one kind of the compound represented by the aforesaid general formula to the abrasive layer. Therefore, proportions of the additive to the abrasive layer can be kept lower than those employed when several kinds of additives are added in order to achieve different effects. Accordingly, the polishing performance of the abrasive tape can be kept good.

DETAILED DESCRIPTION OF THE INVENTION

Figure 1:
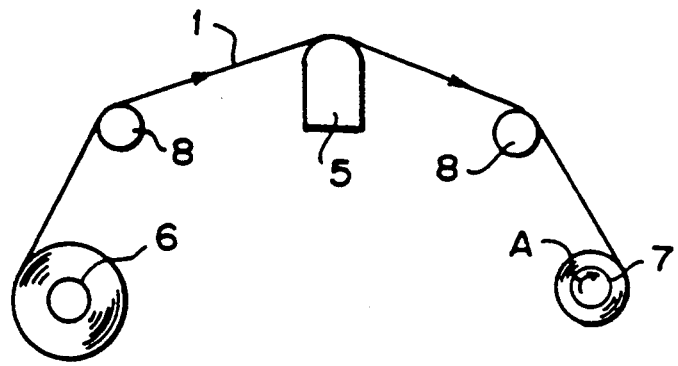
FIG. 1 is a schematic view showing an example of the polishing apparatus wherein an embodiment of the abrasive tape in accordance with the present invention is employed.

From the viewpoint of hydrophilic-lipophilic balance (HLB), the hydrocarbon group which $R_1$ in the aforesaid general formula represents should preferably have six to 22 carbon atoms, and should more preferably have eight to 18 carbon atoms. In cases where $R_1$ represents a fluorine-substituted alkyl group, it should preferably have six to 12 carbon atoms. For the same reasons, $R_2$ should preferably represent a monovalent alkyl group having one to three carbon atoms. Also, X should preferably represent

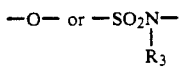

and n should preferably represent an integer of 1 to 22.

By way of example, the compound represented by the aforesaid general formula may be selected from the following compounds:

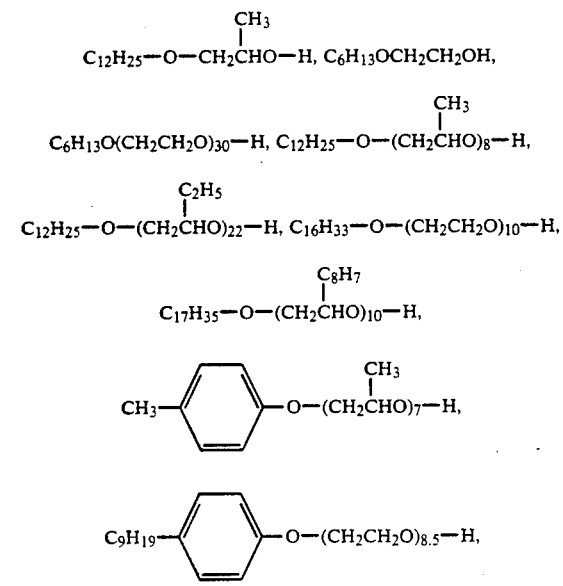

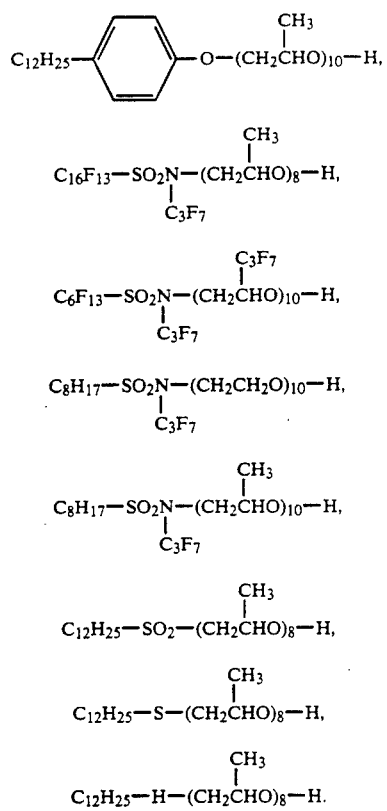

The compounds enumerated above are obtained from an ordinary reaction of higher aliphatic alcohols with polyalkylene glycols. For example, a polyethlene glycol ether which is one kind of the aforesaid compound is obtained from a process wherein an alkaline catalyst is added to an alcohol or a phenol, and ethylene oxide is introduced into the resulting mixture at a temperature within the range of 120° C. to 180° C. at increased pressures or normal pressures. The compounds enumerated above are commercially available as, for example, Emulex 110, and Emulex NP8.5 (supplied by Nippon Emulsion K.K.); Leonil, Pelegal, Diazopon A, Igepal, and Emulphor (supplied by I.G. Farhenindustrie A.G.); Brij (supplied by Atlas Powder Co.); Dispersant (supplied by Oronite Chemical Co.); Emulgen, Levenol, Emasol, and Scourol (supplied by Kao Corp.); Nonion (supplied by Nippon Oil & Fats Co., Ltd.); Noigen (supplied by Dai-ichi Kogyo Seiyaku Co., Ltd.); and Liponox (supplied by Lion Corp.).

As the abrasive grains dispersed in the abrasive layer of the abrasive tape in accordance with the present invention, any of materials which are used generally and which have the polishing effects or scratch polishing effects may be employed. For example, for this purpose, it is possible to employ α-alumina, γ-alumina, fused alumina, silicon carbide, chromium oxide, cerium oxide, corundum, artificial diamond, α-iron oxide, garnet, emery (major constituents: corundum and magnetite), silica, silicon nitride, boron nitride, molybdenum carbide, boron carbide, tungsten carbide, titanium carbide, quartz, tripoli, diatomaceous earth, and dolomite. The abrasive grains should preferably have a Mohs hardness of not less than 6, more preferably a Mohs hardness of not less than 8. One of the above-enumerated materials may be used alone, or two to four materials may be used in combination. The mean grain size of the abrasive grains varies depending on the purposes of polishing. For example, when the abrasive grains are used for rough polishing, the mean grain size should preferably fall within the range of approximately 16 μm to approximately 1 μm. When they are used for finish polishing, the mean grain size should preferably fall within the range of approximately 1 μm to approximately 0.1 μm.

The binder contained in the abrasive layer of the abrasive tape in accordance with the present invention may be a thermoplastic resin, a thermosetting resin, or a reactive resin, which are known in the field of binders, or a mixture of two or more of these resins.

The thermoplastic resin which may be used as the binder in the abrasive layer of the abrasive tape in accordance with the present invention generally has a softening point of 150° C. or lower, an average molecular weight falling within the range of approximately 10,000 to approximately 300,000, and a polymerization degree falling within the range of approximately 50 to approximately 2,000. By way of example, as the thermoplastic resin, it is possible to use a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethylcellulose, or acetyl cellulose), a styrene-butadiene copolymer, a polyester resin, a chlorovinyl ether-acrylic ester copolymer, an amino resin, a synthetic rubber type thermoplastic resin, or a mixture of two or more of these compounds.

The thermosetting resin or the reactive resin which may be used as the binder in the abrasive layer of the abrasive tape in accordance with the present invention generally has a molecular weight of 200,000 or less when the resin takes on the form of a coating composition. When the coating composition is applied onto a substrate and dried, the resin exhibits an infinite increase in the molecular weight through the condensation reaction, the addition reaction, or the like. It is preferable that the resin of this type does not soften or melt before the resin decomposes thermally. Examples of such resins are a phenol resin, a phenoxy resin, an epoxy resin, a polyurethane hardening resin, a urea resin, a melamine resin, an alkyd resin, a silicone resin, an acrylic reactive resin, an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds. The binders enumerated above are used alone or as a mixture of two or more thereof.

In general, the thermoplastic resin, the thermosetting resin, and the reactive resin described above respectively have their major functional groups, and one to six kinds of other functional groups. Each of said other functional groups should preferably be contained in proportions within the range of $1 \times 10^{-6}$eq to $1 \times 10^{-2}$eq per gram of the resin. Examples of said other functional groups are acid groups (which may take on the form of Na salts or the like) such as a carboxylic acid group, a sulfinic acid group, a sulfonic acid group, a phosphoric acid group, a sulfuric acid group, a phosphonic acid group, a phosphinic acid group, a boric acid group, a sulfuric ester group, a phosphoric ester group, and alkyl ester groups with these acids; amino acid groups; amphoteric groups such as an aminosulfonic acid group, a sulfuric ester group with amino-alcohol, a phosphoric ester group with amino-alcohol, and an alkyl betaine group; amino groups; imino groups; imido groups; amido groups; an epoxy group; a hydroxyl group; an alkoxyl group; a thiol group; halogen groups; a silyl group; and a siloxane group.

As the polyisocyanate component which may be used in the binder, it is possible to use, for example, isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate. As the polyisocyanate component, it is also possible to use products of reactions between the above-enumerated isocyanates and polyalcohols, and polyisocyanates produced from condensation of two to 15 molecules of isocyanate monomers. The polyisocyanates enumerated above should preferably have an average molecular weight falling within the range of 100 to 20,000. Such polyisocyanates are commercially available as Coronate L, Coronate HL, Coronate 2030, Coronate 2031, Myrionate MR, and Myrionate MTL (supplied by Nippon Polyurethane K.K.); Takenate D-102, Takenate D-110N, Takenate D-200, Takenate D-202, Takenate 300S, and Takenate 500 (supplied by Takeda Chemical Industries, Ltd.); Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (supplied by Sumitomo Bayer K.K.). These polyisocyanates may be used alone or as a mixture of two or more thereof different in curing reaction properties. In order to promote the curing reaction, compounds having a hydroxyl group (such as butanediol, hexanediol, polyurethane having a molecular weight within the range of 1,000 to 10,000, and water), compounds having an amino group (such as monomethylamine, dimethylamine, and trimethylamine), and catalysts such as metal oxides may be used together with the polyisocyanates. The compounds having a hydroxyl group or an amino group should preferably polyfunctional. The proportions of the polyisocyanate used should preferably fall within the range of 5 to 40 wt % with respect to the total amount of binder components.

The compound, which is represented by the aforesaid general formula and which is used as the additive in the abrasive layer of the abrasive tape in accordance with the present invention, should preferably be added in proportions within the range of 0.5 to 3 wt % with respect to the total amount of the solid contents in the abrasive layer. More preferably, the proportions of the compound should be within the range of 0.5 to 2 wt % with respect to the total amount of the solid contents in the abrasive layer. If the proportions of the compound are higher than 3 wt %, the polishing performance of the abrasive tape will deteriorate. If the proportions of the compound are lower than 0.5 wt %, it will not be possible to obtain substantial effects in improvement of movement stability, prevention of electrostatic charging, and dispersion of abrasive grains.

The present invention will hereinbelow be described in further detail with reference to the accompanying drawings.

Figure 2:
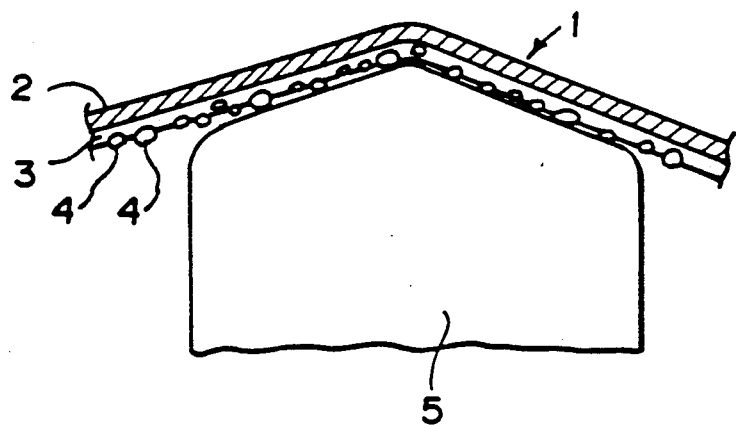
FIG. 2 is an enlarged view showing the abrasive tape and the magnetic head.

With reference to FIG. 1, a tape wind-up reel 7 is rotated in the direction indicated by the arrow A, and an abrasive tape 1 is fed from a tape feed roll 6 in the direction indicated by the arrow. The abrasive tape 1 is threaded over pass rolls 8, 8 so that it is contacted at a predetermined lap angle with a magnetic head 5 which is to be polished. In this manner, the surface of the magnetic head 5 on which the abrasive tape 1 slides is polished by the abrasive tape 1. As shown in FIG. 2, the abrasive tape 1 comprises a flexible non-magnetic substrate 2, which may be constituted of polyethylene terephthalate (PET), polyethylene-2,6-naphthalate or the like, and an abrasive layer 3 overlaid on the flexible non-magnetic substrate 2. The abrasive layer 3 slides on the magnetic head 5 and polishes it. Specifically, as shown in FIG. 2, the abrasive layer 3 has hard abrasive grains 4, 4, . . . protruded therefrom, and the surface of the magnetic head 5 on which the abrasive tape 1 slides is smoothly polished by the hard abrasive grains 4, 4, . . . In order to form the abrasive layer 3, an abrasive coating composition constituted of the abrasive grains 4, 4, . . . , a binder, and an additive which contains at least one kind of the compound represented by the general formula of

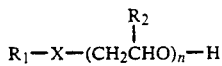

defined above is applied onto the flexible non-magnetic substrate 2.

Preferable thicknesses of the abrasive layer 3 and the flexible non-magnetic substrate 2 vary depending on to what shape the magnetic head 5 is to be polished. In cases where the abrasive tape 1 is to be used for finish polishing of a S-VHS system magnetic head, the thickness of the abrasive layer 3 should preferably be approximately 5 $\mu$m when the thickness of the flexible non-magnetic substrate 2 is 30 $\mu$m. Also, the thickness of the abrasive layer 3 should preferably be approximately 10 [m when the thickness of the flexible non-magnetic substrate 2 is 23 $\mu$m. If the thickness of the abrasive layer 3 is excessively large, the abrasive tape 1 cannot snugly fit to the magnetic head 5. Therefore, the thickness of the abrasive layer 3 should preferably be not larger than 50 $\mu$m.

Figure 3:
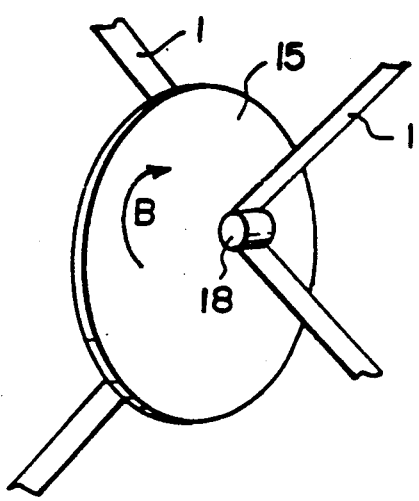
FIG. 3 is a schematic perspective view showing another example of the polishing apparatus wherein an embodiment of the abrasive tape in accordance with the present invention is employed.
Figure 4:
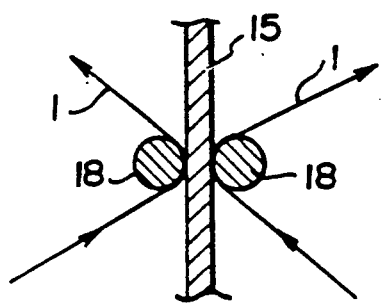
FIG. 4 is a sectional view of the polishing apparatus shown in FIG. 3.

The abrasive tape 1 in accordance with the present invention is suitable particularly for the polishing of a magnetic head having a high performance. However, the abrasive tape 1 in accordance with the present invention may also be used for polishing a hard disk 15 as shown in FIGS. 3 and 4. In cases where the hard disk 15 is to be polished, it is sandwiched between rubber rollers 18, 18, and the abrasive layers of the abrasive tapes 1, 1 are pushed by the rubber rollers 18, 18 against both surfaces of the hard disk 15. The hard disk 15 is then rotated in the direction indicated by the arrow B so that both surfaces of the hard disk 15 are polished simultaneously.

The abrasive tape in accordance with the present invention broadly embraces, in its scope, the abrasive tapes which take on the form of a long strip, and abrasive disks which is constituted of a thin disk-shaped substrate and an abrasive layer overlaid on the substrate.

The present invention will further be illustrated by the following non-limitative examples.

EXAMPLES

Abrasive tapes were made under different conditions as described below. The term "parts" as used hereinbelow means parts by weight (parts by weight of solid contents).

EXAMPLE 1

An abrasive coating composition as shown below was applied to a thickness of 5 $\mu$m onto a 23 $\mu$m-thick polyethylene terephthalate (PET) substrate, and dried to form an abrasive layer. The substrate on which the abrasive layer had been overlaid was slit to a width of ½ inch in order to make an abrasive tape.

| Abrasive coating composition: | |
|---|---|
| $\alpha$-Fe$_2$O$_3$ (granular, mean grain diameter: 0.11 $\mu$m, Mohs hardness: 5.0) | 225 parts |
| Cr$_2$O$_3$ (granular, mean grain diameter: 0.30 $\mu$m, Mohs hardness: 8.5) | 75 parts |
| Vinyl chloride resin (Vinyl chloride having an average molecular weight of 2.6 $\times$ 10$^4$: 87 wt %, epoxy group content: 3.5 wt %, sodium sulfonate group content: 0.5 wt %, where wt % is a value with respect to the weight of the vinyl chloride resin) | 8.3 parts |
| Sulfonic acid group-containing polyurethane resin (molecular weight: 25,000, molecular weight per —SO$_3$H: 25,000) | 4.8 parts |
| Polyisocyanate (75 wt % ethyl acetate solution of a reaction product of 3 mols of 2,4-tolylene diisocyanate compound with 1 mol of trimethylolpropane) | 9.6 parts |
| C$_{16}$H$_{33}$O(CH$_2$CH$_2$O)$_{10}$H (Emulex 110 supplied by Nippoon Emulsion K.K.) | 2.9 parts |
| Methyl ethyl ketone | 100 parts |
| Cyclohexanone | 100 parts |

EXAMPLE 2

An abrasive tape was made in the same manner as that in Example 1, except that the amount of the constituent represented by the formula C$_{16}$H$_{33}$O(CH$_2$C-H$_2$O)$_{10}$H was changed to 1.5 parts.

EXAMPLE 3

An abrasive tape was made in the same manner as that in Example 1, except that the amount of the constituent represented by the formula C$_{16}$H$_{33}$O(CH$_2$C-H$_2$O)$_{10}$ H was changed to 9 parts.

EXAMPLE 4

An abrasive tape was made in the same manner as that in Example 1, except that a constituent represented by the formula of

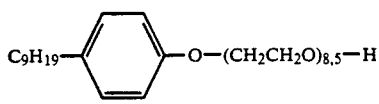

(Emulex NP8.5 supplied by Nippon Emulsion K.K.) was used in lieu of the constituent represented by the formula $C_{16}H_{33}O(CH_2CH_2O)_{10}H$.

EXAMPLE 5

An abrasive tape was made in the same manner as that in Example 1, except that a constituent represented by the formula of

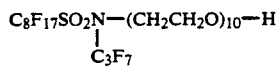

was used in lieu of the constituent represented by the formula $C_{16}H_{33}O(CH_2CH_2O)_{10}H$.

EXAMPLE 6

An abrasive tape was made in the same manner as that in Example 1, except that a constituent represented by the formula $C_{16}H_{13}OCH_2CH_2OH$ was used in lieu of the constituent represented by the formula $C_{16}H_{33}O(CH_2CH_2O)_{10}H$.

EXAMPLE 7

An abrasive tape was made in the same manner as that in Example 1, except that a constituent represented by the formula $C_6H_{13}O(CH_2CH_2O)_{30}H$ was used in lieu of the constituent represented by the formula $C_{16}H_{33}O(CH_2CH_2O)_{10}H$.

COMPARATIVE EXAMPLE 1

An abrasive tape was made in the same manner as that in Example 1, except that, instead of the constituent represented by the formula $C_{16}H_{33}O(CH_2CH_2O)_{10}H$ being used, 2.9 parts of butyl stearate serving as a movement stability improving agent, 2.9 parts of cationic antistatic agent (Elecond X-1-D supplied by Senken Kagaku K.K.), and 2.9 parts of lecithin serving as a dispersing agent were used.

COMPARATIVE EXAMPLE 2

An abrasive tape was made in the same manner as that in Comparative Example 1, except that the cationic antistatic agent was eliminated from the abrasive coating composition.

COMPARATIVE EXAMPLE 3

An abrasive tape was made in the same manner as that in Example 1, except that the constituent represented by the formula $C_{16}H_{33}O(CH_2CH_2O)_{10}H$ was eliminated from the abrasive coating composition.

The abrasive tapes of Examples 1 through 7 and Comparative Examples 1, 2, and 3 were used to polish ferrite video heads. During the polishing, in order to evaluate tape movement stability, an investigation was made as to whether the abrasive tapes generate a chirping sound. After the polishing was finished, the number of scratches generated on the surfaces of the video heads were counted in order to evaluate the effects in prevention of electrostatic charging and in dispersibility of the abrasive grains. Also, the time required for polishing of the video heads was investigated in order to evaluate the polishing performance, and surface roughness (Ra) of the abrasive tapes were investigated. Table below shows the results of these investigations and the results of overall evaluation.

In order to investigate the chirping sound, each abrasive tape was moved in contact with a video head in the polishing apparatus, and an investigation was made as to whether abnormal sound was or was not generated during the movement. In order to investigate the number of scratches generated on the surface of video head, the surface of the video head which had been polished for one minute with each abrasive tape was observed with a microscope, and scratches having a width of at least 2 μm were counted. The time required to polish the video head was the time required to polish the ferrite video head by 1 μm. The surface roughness (Ra) of the abrasive layer of each abrasive tape was measured at a cut-off value of 0.8 mm, a stylus radius of 2 μm and a stylus speed of 3 mm/sec.

TABLE

| | Chirping | Scratches on video head surface | Surface roughness (Ra) | Time required to polish (sec.) | Overall evaluation |
| --- | --- | --- | --- | --- | --- |
| Ex. 1 | None | 0 | 0.045 | 21 | ○ |
| Ex. 2 | None | 0 | 0.050 | 20 | ○ |
| Ex. 3 | None | 0 | 0.043 | 25 | ○ |
| Ex. 4 | None | 0 | 0.047 | 23 | ○ |
| Ex. 5 | None | 0 | 0.044 | 22 | ○ |
| Ex. 6 | None | 0 | 0.046 | 21 | ○ |
| Ex. 7 | None | 0 | 0.044 | 23 | ○ |
| Comp. Ex. 1 | None | 0 | 0.040 | 98 | X |
| Comp. Ex. 2 | None | 11 | 0.044 | 53 | X |
| Comp. Ex. 3 | Generated | 50 | 0.088 | 20 | X |

As is clear from Table shown above, the abrasive tapes of Examples 1 through 7 in accordance with the present invention exhibited good movement stability and good dispersibility of abrasive grains. Also, the abrasive tapes in accordance with the present invention were free of electrostatic charging so that no dust which would detrimentally scratched the surfaces of video heads adhered to the abrasive tapes. Moreover, the abrasive tapes in accordance with the present invention had polishing performance which was nearly equal to the polishing performance of the abrasive tape of Comparative Example 3 which tape contained no additive, and it was confirmed that the abrasive tapes in accordance with the present invention had very good polishing performance.

We claim:

1. An abrasive tape comprising a flexible substrate and an abrasive layer which is overlaid on said flexible substrate and which consists essentially of abrasive grains, a binder, and an additive, wherein said additive contains at least one kind of a compound represented by the general formula of

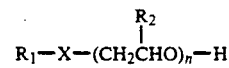

where $R_1$ represents a monovalent hydrocarbon group having six to 30 carbon atoms, or a fluorine-substituted alkyl group having one to 17 carbon atoms, $R_2$ represents H or a monovalent alkyl group having one to three carbon atoms, X represents either one of

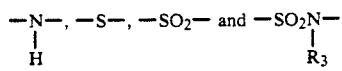

where $R_3$ is $C_3F_7$, and n is an integer of 1 to 30.

2. An abrasive tape as defined in claim 1 wherein the hydrocarbon group which $R_1$ in said general formula represents has six to 22 carbon atoms.

3. An abrasive tape as defined in claim 2 wherein the hydrocarbon group which $R_1$ in said general formula represents has eight to 18 carbon atoms.

4. An abrasive tape as defined in claim 1 wherein the fluorine-substituted alkyl group which $R_1$ in said general formula represents has six to 12 carbons atoms.

5. An abrasive tape as defined in claim 1 wherein $R_2$ in said general formula represents a monovalent alkyl group having one to three carbon atoms.

6. An abrasive tape as defined in claim 1 wherein X in said general formula represents

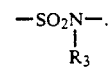

7. An abrasive tape as defined in claim 1 wherein n in said general formula represents an integer of 1 to 22.

8. An abrasive tape as defined in claim 1 wherein said abrasive grains have a Mohs hardness of not lower than 6.

9. An abrasive tape as defined in claim 8 wherein said abrasive grains have a Mohs hardness of not lower than 8.

10. An abrasive tape as defined in claim 1 wherein at least one kind of said compound represented by said general formula is added in proportions within the range of 0.5 to 3 wt % with respect to the total amount of the solid contents in said abrasive layer.

11. An abrasive tape as defined in claim 10 wherein at least one kind of said compound represented by said general formula is added in proportions within the range of 0.5 to 2 wt % with respect to the total amount of the solid contents in said abrasive layer.

* * * * *